United States Patent
Freeman

(10) Patent No.: US 8,186,432 B2
(45) Date of Patent: May 29, 2012

(54) WELL LOGGING FLUID FOR ULTRASONIC CEMENT BOND LOGGING

(75) Inventor: Michael A. Freeman, Kingwood, TX (US)

(73) Assignee: M-1 LLC, Houston, TX (US)

( * ) Notice: Subject to any disclaimer, the term of this patent is extended or adjusted under 35 U.S.C. 154(b) by 772 days.

(21) Appl. No.: 12/090,963

(22) PCT Filed: Oct. 19, 2006

(86) PCT No.: PCT/US2006/040948
§ 371 (c)(1),
(2), (4) Date: Jul. 10, 2008

(87) PCT Pub. No.: WO2007/047878
PCT Pub. Date: Apr. 26, 2007

(65) Prior Publication Data
US 2008/0314586 A1    Dec. 25, 2008

Related U.S. Application Data

(60) Provisional application No. 60/729,424, filed on Oct. 21, 2005.

(51) Int. Cl.
*E21B 47/14* (2006.01)
*C09K 8/00* (2006.01)

(52) U.S. Cl. ............. 166/254.2; 166/250.14; 166/253.1; 367/25; 507/269

(58) Field of Classification Search .......... None
See application file for complete search history.

(56) References Cited

U.S. PATENT DOCUMENTS

| | | | | |
|---|---|---|---|---|
| 4,779,236 A | * | 10/1988 | Sondergeld | 367/31 |
| 4,813,028 A | | 3/1989 | Liu | |
| 5,036,496 A | * | 7/1991 | Rutledge | 367/35 |
| 5,357,482 A | * | 10/1994 | O'Sullivan et al. | 367/35 |
| 5,592,438 A | * | 1/1997 | Rorden et al. | 367/83 |
| 5,712,829 A | | 1/1998 | Tang et al. | |
| 6,538,958 B1 | * | 3/2003 | Blankinship et al. | 367/35 |

FOREIGN PATENT DOCUMENTS

| EP | 0 073 335 A1 | 3/1983 |
|---|---|---|
| EP | 0 587 405 A2 | 3/1994 |

OTHER PUBLICATIONS

International Search Report issued in PCT/US2006/040948 mailed on Feb. 26, 2007, 2 pages.
PCT Written Opinion issued in PCT Application No. PCT/US2006/040948 dated Feb. 26, 2007 (5 pages).
Office Action issued in Mexican Application No. 68083 dated Sep. 21, 2010 (3 pages).
Office Action issued in related Canadian Patent Application 2,625,379; Dated Jan. 25, 2012 (3 pages).

* cited by examiner

*Primary Examiner* — Zakiya W Bates
(74) *Attorney, Agent, or Firm* — Osha • Liang LLP

(57) ABSTRACT

A well logging fluid, and methods of using the same, include a base fluid selected from water, water-based mud, or oil-based mud, and an additive material selected from silica or cork or alike. The fluid has an impedance substantially different from that of the base fluid. Such a modified impedance helps improve the measurement accuracy.

20 Claims, 2 Drawing Sheets

WELL LOGGING FLUID FOR ULTRASONIC CEMENT BOND LOGGING

BACKGROUND OF INVENTION

1. Field of the Invention

The invention relates generally to acoustic (sonic or ultrasonic) logging.

2. Background Art

In a typical oil or gas well drilling process, a string of casing, typically made of steel, is lowered into the well bore after the drill pipe is removed. Drilling or logging fluid, such as water-based mud (WMB) or oil-based mud (OBM), is used in the well bore to compensate the formation pressure. A fill material (typically cement) is then pumped into the annulus between the casing and the well wall, and replaces the mud and forms a sheath (or a cement bond as it is often called) serving the functions of isolating formation layers and protecting the casing.

The evaluation of the cement bond is important for determining whether the bond functions properly to prevent liquids (such as water, oil, or mud) from migrating from one formation layer to another. Such an evaluation is typically done during cement bond logging, using sonic or ultrasonic transmitters and sensors. During acoustic logging, acoustic pulses are emitted from the transmitters in a sonde. These pulses pass through the fluids inside the casing, and are partially reflected from the fluid/steel interface. Part of the pulses propagate further and are partially reflected at the steel/cement interface and the cement/formation interface. The reflected signals are recorded by the sensors and analyzed.

Cement bond logging using acoustic sensors depends on the impedance mismatching between steel casing and fluids as compared to casing and cement. To a rough approximation the impedance of a material 1 ($Z_1$) can be expressed as:

$$Z_1 = \rho_{01} C_1 \quad \text{Eq. (1)}$$

where $\rho_{01}$ is the static density of the material 1, $C_1$ is the speed of sound in the material 1. The transmitted and reflected amplitude of acoustic waves at the interface between material 1 and material 2 of different impedances is given by:

$$A_i - A_r = \frac{Z_1 \sec \Theta_1}{Z_1 \sec \Theta_2} A_t; \quad \text{Eq. (2)}$$

where $A_i$ is the amplitude of the incident wave, $A_r$ is the amplitude of the reflected wave, $A_t$ is the amplitude of the transmitted wave, $\Theta_1$ is the angle of propagation in material 1 and $\Theta_2$ is the angle of propagation in material 2, measured from an axis perpendicular to the interface. When the impedance of a material is non-isotropic, Z has a tensor form. For exemplary purposes we do not use the tensor description of Z. There are also constant factors that normalize Eq. (2) to yield fractional results which have been omitted. The simple form of Eq. (2) is used throughout the application to illustrate the physical principles involved.

SUMMARY OF INVENTION

In one aspect, embodiments disclosed herein relate to a method for well logging, comprising modifying an impedance of a well logging fluid, and transmitting acoustic signals through the well logging fluid toward a casing.

In another aspect, embodiments disclosed herein relate to a method for well logging, comprising modifying an impedance of a well logging fluid, and transmitting and receiving acoustic signals through the well logging fluid toward and from reflective surfaces within and without the well bore, including the exposed surface geological formations at the well bore wall. Fractures in the formations, both induced and natural, may also present reflections. Gross compositional changes, such as sharp folds or inter-bedded sands and shales can also be reflective. The magnitude, phase and transit times of acoustic signals reflected from such features may reveal the shape and rougosity of the bore, the nature and magnitude of homogeneous and inhomogeneous stresses present in the formations at and around the bore hole.

In another aspect, embodiments disclosed herein relate to a method for using a well logging fluid, preparing the well logging fluid, comprising the steps of: obtaining an additive material having a substantially different impedance compared with the impedance of a base material, in the form of particles having sizes substantially smaller than the wavelength of an acoustic signal, and mixing a base fluid with the additive material, pumping the well logging fluid into a well, and transmitting and receiving acoustic signals through said well logging fluid.

In another aspect, embodiments disclosed herein relate to a well logging fluid, comprising a base fluid and an additive material having substantially different impedance compared with the impedance of said base fluid.

Figure 1:
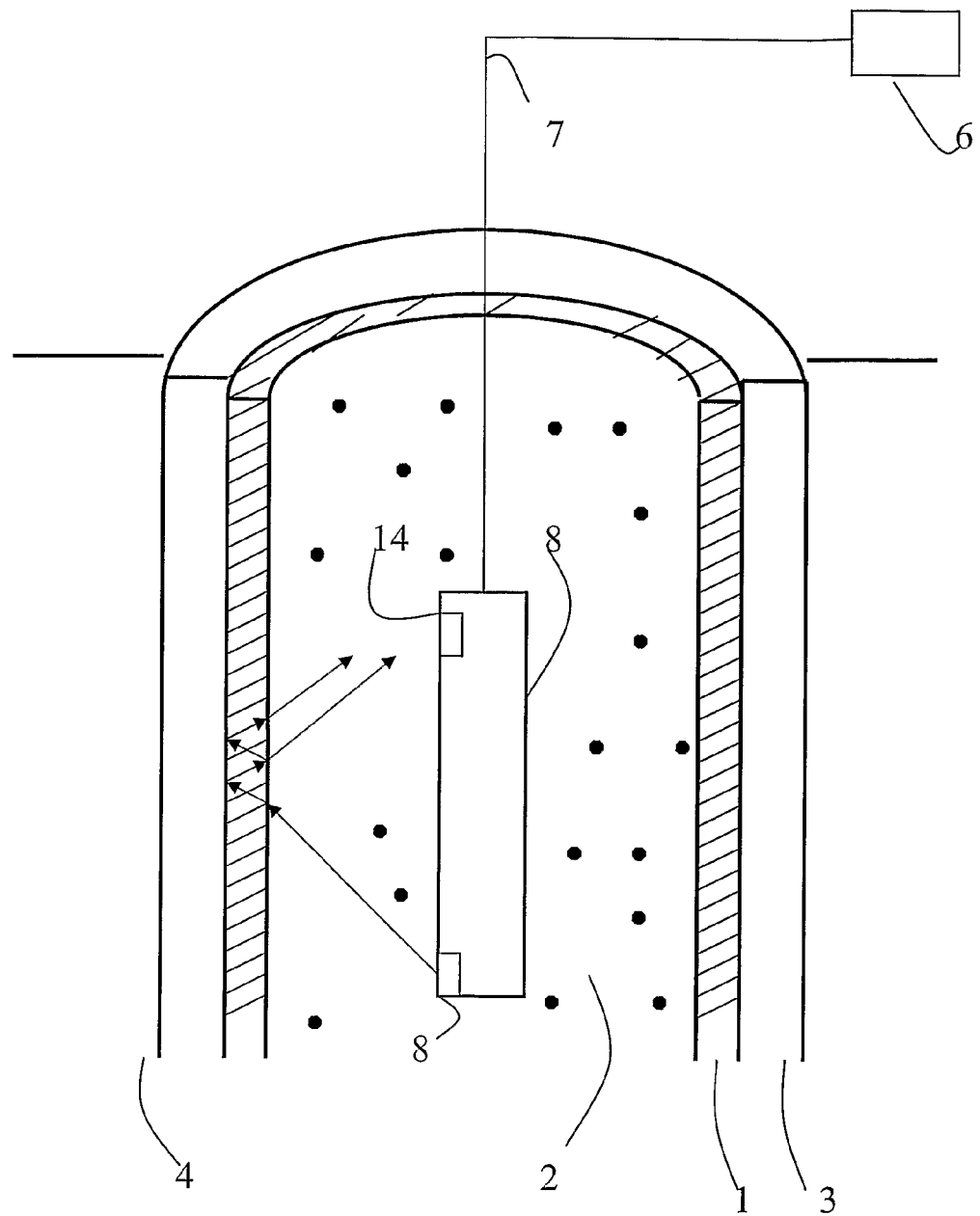
FIG. 1 is a schematic diagram of a logging operation.

It is to be understood that the drawings are to be used for the purpose of illustration only, and not as a definition of the metes and bounds of the invention, or as a basis for reading non-existent or un-recited limitations into the claims.

DETAILED DESCRIPTION

In one aspect, embodiments disclosed herein relate to cement bond logging, and methods to manipulate impedance of well logging fluid. As noted above, cement bond logging is important for quality control of the cement bond. Such logging is done by transmitting acoustic pulses through the logging fluid and the casing, and receiving the reflected pulses from the casing/cement interface.

In general, the sensitivity of measuring the cement bond quality is determined by the strength and the temporal extension (the ring time) of the reflected acoustic pulses. Factors affecting the measurements include the reflection and transmission of the acoustic pulses at the fluid/casing interface. The amplitude of reflected pulses depends strongly on the ratio of the impedance of the fluid and that of the casing, as noted above.

Typically, logging applications use steel for the casing, and water, or water-based mud, or oil-based mud as the logging fluid. If the impedance of the casing or the impedance of the logging fluid can be adjusted, the measurements of the reflected pulses can be optimized. Embodiments disclosed herein involve methods to manipulate the impedance of the logging fluid, and a well logging fluid having substantially modified impedance.

Table 1 lists sound velocity (C, in units of i/s), density ($\rho$), and Z factors for a number of materials. The impedance of composite materials can be estimated as the volumetric average of the impedances of the individual components, so long as the average particle sizes are significantly smaller than the wavelength of the sound. In this case, the acoustic wavelengths are on the order of centimeters while the particles in drilling fluids are in the range of 1 micron to 100 microns, satisfying this criterion. Note that because it is not drilled with, one may also choose to employ larger or smaller particles in a logging fluid to obtain desirable acoustic properties, such as scattering and dephasing of shorter wavelength signals.

It is apparent from Table 1 that steel and cement have very different Z values. Using Eq. (2), the percentage of the incident amplitude that is transmitted (for exemplary purposes assuming a 90° incidence, sec $\Theta=1$) is proportional to the ratio $Z_{steel}/Z_{cement}$, roughly 46926/9860, or about 4.8. This ratio is significantly different from $Z_{steel}/Z_{water}=31.3$. This difference in Z ratios lays the foundation of cement bond logging, that is, measuring the power reflected from the back side of the casing is a sensitive way to tell if the interface is steel/cement or steel/fluid, in other words if the cement has completely replaced the fluid.

TABLE 1

| Material | C, m/s | ρ, sg | $Z_{est}$ | $Z_{steel}/Z$ | $Z_{cmnt}/Z$ |
|---|---|---|---|---|---|
| aluminum | 6420 | 2.7 | 17270 | 2.7 | 0.6 |
| beryllium | 12890 | 1.9 | 23847 | 2.0 | 0.4 |
| steel, 1% c | 5940 | 7.9 | 46926 | 1.0 | 0.2 |
| titanium | 6070 | 4.5 | 27315 | 1.7 | 0.4 |
| Silica | 5968 | 2.6 | 15756 | 3.0 | 0.6 |
| glass, flint | 3980 | 2.6 | 10348 | 4.5 | 1.0 |
| Lucite | 2680 | 1.2 | 3189 | 14.7 | 3.1 |
| nylon | 2620 | 1.2 | 3144 | 14.9 | 3.1 |
| polyethylene | 1920 | 1.1 | 2112 | 22.2 | 4.7 |
| pentadecene | 1351 | 0.78 | 1054 | 44.5 | 9.4 |
| water | 1497 | 1.0 | 1497 | 31.3 | 6.6 |
| seawater | 1535 | 1.1 | 1689 | 27.8 | 5.8 |
| cement | 3200-3600 | 2.9 | 9860 | 4.8 | 1.0 |
| cork | 366-518 | 0.24 | 108 | 434.5 | 91.3 |
| barite | 4000 | 4.2 | 1922 | 24.4 | 5.1 |
| Mud | | | | | |
| WBM, barite | | 1.00 | 1497 | 31 | 6.6 |
| | | 1.25 | 1529 | 31 | 6.4 |
| | | 1.50 | 1562 | 30 | 6.3 |
| | | 1.75 | 1594 | 29 | 6.2 |
| | | 2.00 | 1627 | 29 | 6.1 |
| | | 2.25 | 1659 | 28 | 5.9 |
| OBM, with 80:20 ratio of | | 0.844 | 1181 | 40 | 8.4 |
| oil to emulsified brine in | | 1.00 | 1214 | 39 | 8.1 |
| the liquid phase, and | | 1.25 | 1269 | 37 | 7.8 |
| suspended barite | | 1.50 | 1323 | 35 | 7.5 |
| | | 1.75 | 1377 | 34 | 7.2 |
| | | 2.00 | 1431 | 33 | 6.9 |

The acoustic wave pulses must be transmitted through drilling fluid into the casing, and emanate from the casing to the receiver. This casing/fluid interface reflects sound as well. If the reflection is strong, it returns a second pulse, or echo, to the backside casing interface, allowing a second reflected power measurement. This echo sequence can extend for several cycles. The power received by the sensors depends critically on the value of $Z_{steel}/Z_{fluid}$.

Referring to FIG. 1, which shows a schematic diagram of a logging operation in gas or oil well drilling process, where a string of casing 1, typically made of steel, is lowered into the well bore after the drill pipe is removed. Drilling fluid 2, which was pumped into the well bore during the drilling, remains in the well bore to compensate the formation pressure. A fill material 3 (typically cement) is then pumped into the annulus between the casing and the well wall 4. The cement replaces the mud and forms a sheath (or a cement bond as it is often called) serving the functions of isolating formation layers in the well wall 4 and protecting the casing 1. Evaluation of the quality of the cement bond is typically done during cement bond logging, where a data processing system 5 processes data sent through the wire line 6, from the sonde 7. In the sonde 7, an acoustic transmitter or a plurality of such transmitters 8 emit sonic or ultrasonic pulses. The reflected pulses are collected by a receiver or a plurality of such receivers 14 and sent to the data processing system 5 to be analyzed.

Figure 2:
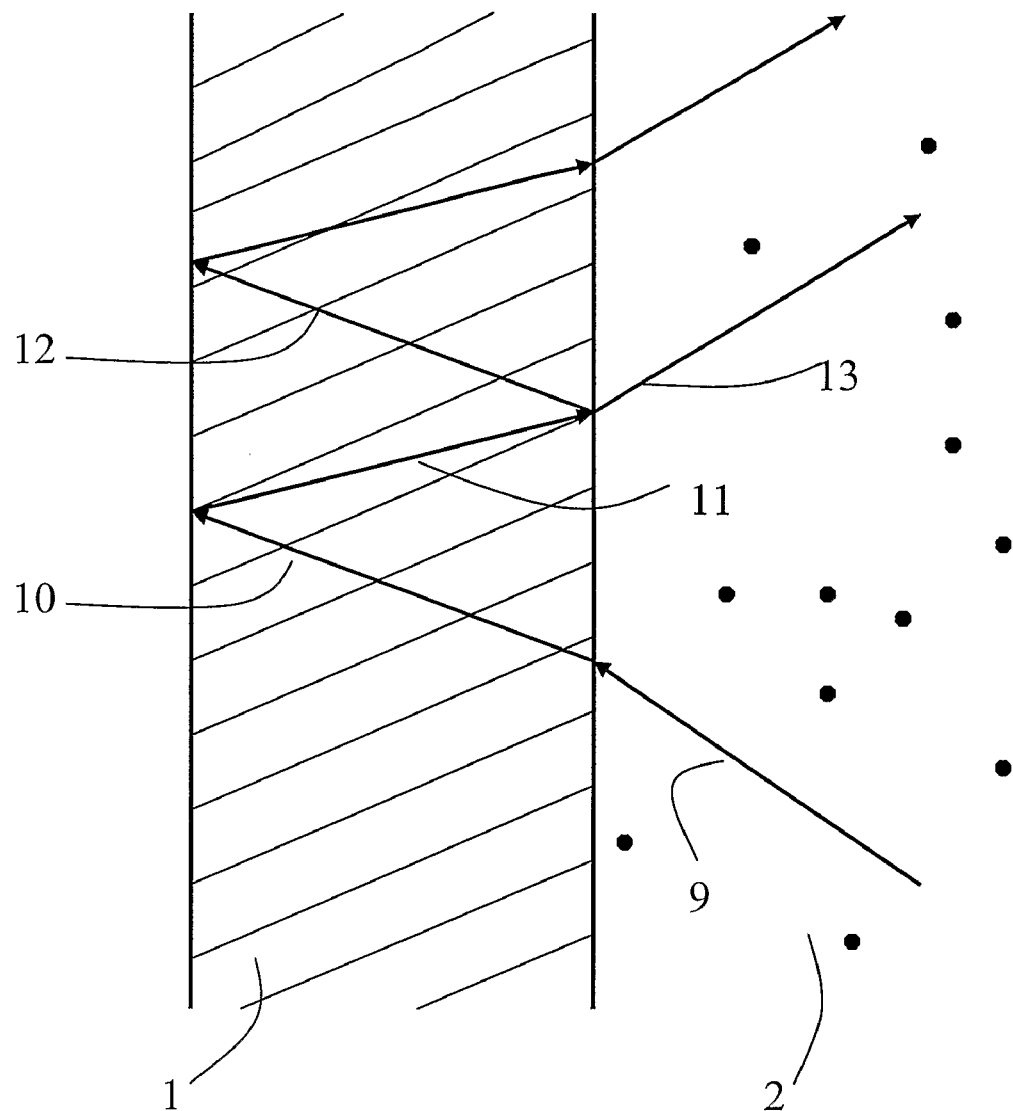
FIG. 2 shows a plurality of exemplary paths traversed by acoustic pulses in a cased well.

Referring to FIG. 2, sonic or ultrasonic pulses 9 emitted by the transmitter 8 of FIG. 1 transmit through the fluid 2. The fluid 2 in the embodiments has a modified impedance. A partially-transmitted pulse 10 in the casing 1 is reflected at the steel/cement boundary and becomes the reflected pulse 11. The reflected pulse 11 may be further reflected at the steel/fluid boundary and becomes the pulse 12, or may be partially transmitted through the steel/fluid boundary and becomes pulse 13, which is received by a receiver or a plurality of such receivers.

In this embodiment, the impedance of the fluid within the casing ($Z_{fluid}$) is modified in order to provide improved measurements of the cement bond 3. Engineering of the $Z_{fluid}$ may achieved by using additives having substantially different impedance from said base fluid. Alternatively, the fluid could be pre-formulated to have a selected impedance.

By lowering the $Z_{fluid}$, a stronger reflection signal 12 can be obtained that may bounce inside the casing 1 many times, thus increasing measurable ring times. This will improve the accuracy of measuring the reflected power from the back side.

On the other hand, raising $Z_{fluid}$ allows more of the reflected signal 11 to escape and become transmitted signal 13, without being further reflected back and forth inside the casing 1, thus shortening the ring time, and in turn increasing the rate at which new pulses could be applied.

The present invention provides a method to lower the $Z_{fluid}$, or to raise $Z_{fluid}$, depending on the requirements of increasing the reflected power, or shortening the ring time, to obtain improved measurement results.

As shown in table 1, several materials can produce substantial changes in $Z_{fluid}$'s. Cork and silica (quartz) are two examples of readily available, non-toxic substances that can be added to water or oil-based mud (OBM) to change their impedance. Cork and quartz allow fluids to be made up that retain the density required to assure hydrostatic pressure and yet have substantially different impedances from the materials currently used in fluids during logging activity. Those having ordinary skill in the art will recognize that a number of materials exist that may be used to modify the impedance of a fluid.

In the following Example 1, adding silica to the water-based (WB) fluid is shown to lower the value of $Z_{steel}/Z_{WB}$ from 31.3 to a range of 5-13. This corresponds to a modification by about 60%-90%. This reduction in ratio is shown for exemplary purpose only, and a person of ordinary skill in the art would understand that the amount of silica may be adjusted in the WB to obtain a different change in $Z_{steel}/Z_{WB}$. Embodiments of the present invention involve "substantial" changes to these ratios. As used herein substantial means a change in ratio of greater than about 10% or by enough to affect impedance in a manner to improve logging performances. Such a change can be achieved by adding at least 20% of silica by weight to WB.

Example 1

| Material | C, m/s | ρ, sg | $Z_{est}$ | $Z_{steel}/Z$ | $Z_{cmnt}/Z$ |
|---|---|---|---|---|---|
| Silica Pill, WB | | | | | |
| | | 1.25 | 3671 | 13 | 2.7 |
| | | 1.50 | 5844 | 8 | 1.7 |
| | | 1.75 | 8018 | 6 | 1.2 |
| | | 2.00 | 10191 | 5 | 1.0 |

Such a pill could be made up from a suspending agent, such as xanthan gum, in water at a high enough concentration to effectively suspend the sand for the duration of the measurements. For example, a barrel of water viscosified with 2.5 lb/bbl of FLO-VIS-brand xanthan gum could be used to suspend 10 μ-diameter sand for 24 hours at 20° C.

In the following Example 2, adding silica to the oil-based mud (OBM) is shown to lower the ratio of $Z_{steel}/Z_{OBM}$ from 33-40 to a range of 4-19. This corresponds to a change of 40%-90%. This range is for exemplary purpose only, and a person of ordinary skill in the art can adjust the amount of silica in the OBM to obtain a different change in $Z_{steel}/Z_{OBM}$. Embodiments of the present invention involve "substantial" changes to these ratios. As used herein substantial means a change in ratio of greater than about 10% or by enough to affect impedance in a manner to improve logging performances. Such a change can be achieved by adding at least 10% of silica by weight to OBM.

Example 2

| Material | C, m/s | ρ, sg | $Z_{est}$ | $Z_{steel}/Z$ | $Z_{cmnt}/Z$ |
|---|---|---|---|---|---|
| Silica Pill, OBM | | | | | |
| | | 1.00 | 2447 | 19 | 4.0 |
| | | 1.25 | 4475 | 10 | 2.2 |
| | | 1.50 | 6504 | 7 | 1.5 |
| | | 1.75 | 8533 | 5 | 1.2 |
| | | 2.00 | 10562 | 4 | 0.9 |
| | | 2.25 | 12591 | 4 | 0.8 |

In the following Example 3, adding cork to the water-based mud (WBM) is shown to raise the ratio of $Z_{steel}/Z_{WBM}$ from 28-31 to a range of 29-61. This corresponds to an increase of up to 100%. This range is for exemplary purpose only, and a person of ordinary skill in the art can adjust the amount of cork in the WB to obtain a different change in $Z_{steel}/Z_{WBM}$. Embodiments of the present invention involve "substantial" changes to these ratios. As used herein substantial means a change in ratio of greater than about 10% or by enough to affect impedance in a manner to improve logging performances. Such a change can be achieved by adding at least 5% of cork by weight to WBM.

Example 3

| Material | C, m/s | ρ, sg | $Z_{est}$ | $Z_{steel}/Z$ | $Z_{cmnt}/Z$ |
|---|---|---|---|---|---|
| Cork Pill, WBM | | | | | |
| | | 1.00 | 764 | 61 | 12.9 |
| | | 1.25 | 980 | 48 | 10.1 |
| | | 1.50 | 1195 | 39 | 8.2 |
| | | 1.75 | 1411 | 33 | 7.0 |
| | | 2.00 | 1627 | 29 | 6.1 |

Advantages of the present invention include, but are not limited to: manipulating the impedance of the logging fluid provides a new dimension of freedom for obtaining optimal measurements. Such a manipulation is much easier than changing the impedance of the casing or the cement.

By extension, such a manipulation can be seen to offer advantages to other applications of acoustic reflective logging, such as the determination of the true shape and roughness of the bore hole, the near- and far-field stress fields in the drilled formations and the presence of natural and induced fractures.

Also by extension, such a manipulation can be seen to offer advantages to the transmission of acoustic energy through the surface of the well bore, to be received by receivers outside of the bore, at surface or in adjacent bores.

While the invention has been described with respect to a limited number of embodiments, those skilled in the art, having benefit of this disclosure, will appreciate that other embodiments can be advised which do not depart from the scope of the invention as disclosed herein. Accordingly, the scope of the invention should be limited only by the attached claims.

What is claimed is:

1. A method for well logging, comprising:
    modifying an impedance of a well logging fluid to affect the propagation and reflection of acoustic signals used in logging; and
    transmitting acoustic signals through said well logging fluid toward reflective features at and behind the wall of the bore hole.

2. The method of claim 1, wherein said modifying the impedance of the well logging fluid is achieved by mixing a base fluid with an additive material having substantially different impedance compared with the impedance of said base fluid.

3. The method of claim 2, wherein the base fluid is at least one selected from water, water-based mud, and oil-based mud.

4. The method of claim 2, wherein the additive material is at least one selected from silica and cork.

5. The method of claim 4, wherein the additive material is in the form of particles suspended in the base fluid.

6. The method of claim 5, wherein the additive material particles have sizes in the range of 1 micron to 100 microns.

7. The method of claim 2, wherein the additive material constitutes at least 1%, by weight, of said well logging fluid.

8. The method of claim 1, wherein the acoustic signals are transmitted by an acoustic transmitter or a plural of transmitters, and received by a sensor or a plural of sensors.

9. The method of claim 8, wherein the acoustic signals are pulses with a wavelength in the sonic or ultrasonic range.

10. The method of claim 1, wherein the acoustic signals are directed at an angle or vertical to the fluid/casing interface.

11. A method for well logging, comprising:
    modifying an impedance of a well logging fluid with respect to a cement bond; and
    transmitting acoustic signals through said well logging fluid toward a casing.

12. A method for using a well logging fluid, comprising:
preparing the well logging fluid, comprising:
 obtaining an additive material having a substantially different impedance compared with the impedance of a base material, in the form of particles having sizes substantially smaller than the wavelength of an acoustic signal; and
 mixing a base fluid with the additive material;
pumping the well logging fluid into a well; and
transmitting and receiving acoustic signals through said well logging fluid.

13. A well logging fluid, comprising:
a base fluid; and
an additive material having substantially different impedance compared with the impedance of said base fluid,
wherein the additive material is in the form of particles suspended in the base fluid.

14. The well logging fluid of claim 13, wherein the base fluid is at least one selected from water, water-based mud, and oil-based mud.

15. The well logging fluid of claim 13, wherein the additive material is at least one selected from silica and cork.

16. The well logging fluid of claim 13, wherein adding the additive material to the base fluid results in a substantially modified impedance of said well logging fluid.

17. The well logging fluid of claim 13, wherein the additive material constitutes at least 1%, by weight, of said well logging fluid.

18. The well logging fluid of claim 13, wherein the average particle sizes are significantly smaller than the wavelength of an acoustic signal.

19. The well logging fluid of claim 18, wherein the additive material particles have sizes in the range of 1 micron to 100 microns.

20. The well logging fluid of claim 13, wherein the additive material particles have sizes in the range of 1 micron to 100 microns.

\* \* \* \* \*